UNITED STATES PATENT OFFICE.

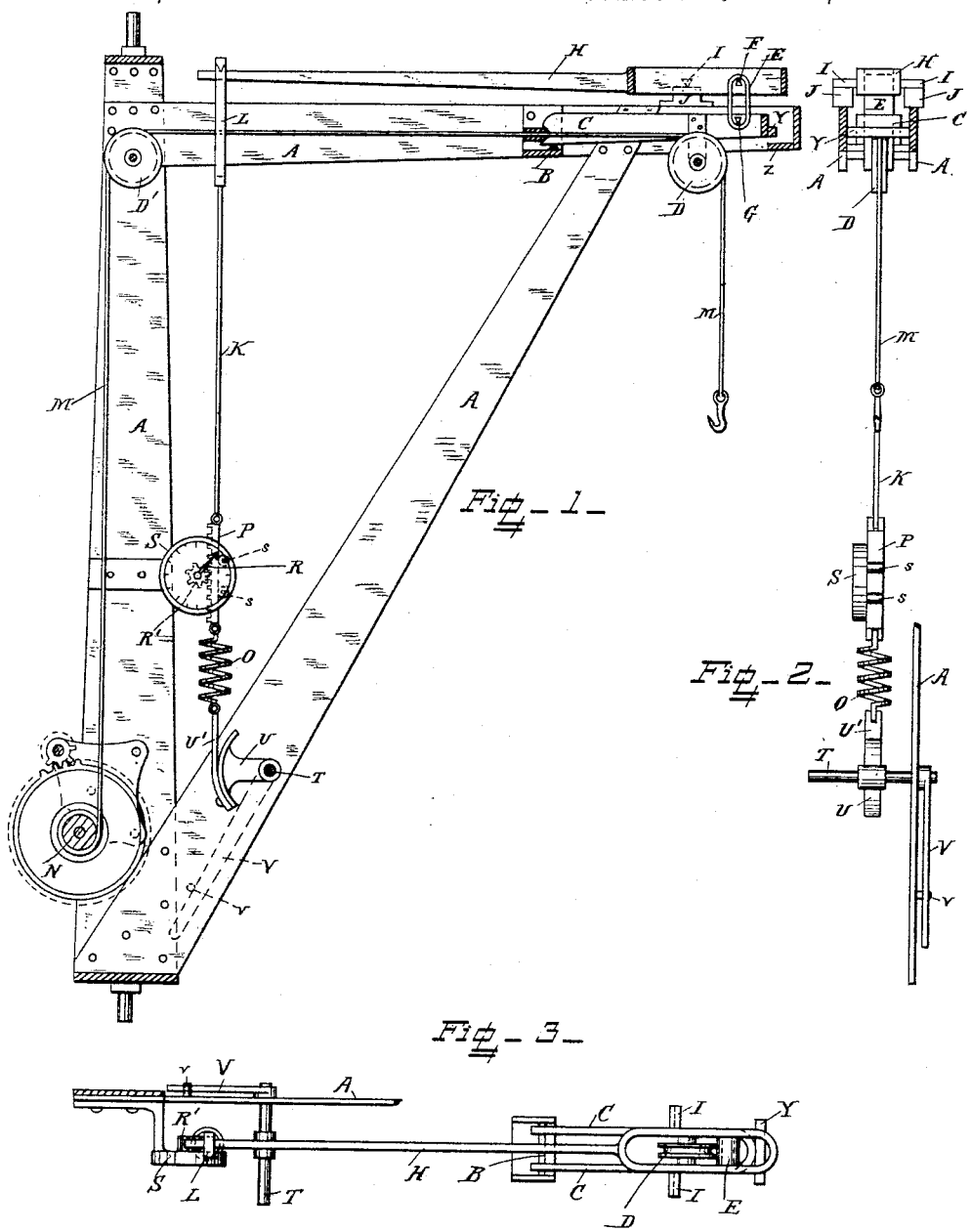

JAMES GASKELL, OF BURSLEM, ENGLAND.

CRANE FOR LIFTING WEIGHTS.

SPECIFICATION forming part of Letters Patent No. 449,529, dated March 31, 1891.

Application filed February 10, 1890. Renewed January 14, 1891. Serial No. 377,736. (No model.) Patented in England February 10, 1888, No. 2,017.

*To all whom it may concern:*

Be it known that I, JAMES GASKELL, a subject of the Queen of Great Britain, residing at 1 Blake Street, Hall Street, Burslem, in the county of Stafford, England, have invented certain new and useful Improvements Relating to Cranes and Similar Appliances for Lifting Weights, (for which I have obtained a patent in Great Britain, No. 2,017, dated February 10, 1888;) and I do hereby declare the following to be a full, clear, and exact description of the invention, such as will enable others skilled in the art to which it appertains to make and use the same.

This invention relates to cranes; and it consists in the novel construction and combination of the parts hereinafter fully described and claimed, whereby the load on the crane may be weighed.

In the drawings, Figure 1 is a longitudinal vertical section through the frame of the crane, showing the weighing mechanism applied to it. Fig. 2 is an end view of the weighing mechanism, and Fig. 3 is a plan view of the same from above.

A is the crane-frame, which may be of any approved construction, but preferably consists of two sides having the lifting mechanism supported between them, as shown in the drawings.

N is the lifting-barrel, operated in the usual manner.

M is the lifting rope or chain, and D and D' are guide-sheaves over which the said rope is conducted from the head of the crane to the barrel. The head-sheave D is journaled in the double lever C. The front end of this lever is provided with a cross-bar Y, which rests upon the stop-plate Z, secured to the frame when the weighing mechanism is not in use. The rear end of lever C is pivoted on the knife-edges B, secured to the said frame.

H is a steelyard provided with knife-edge pivots I, supported on brackets J above the top member of the crane-frame and in line therewith.

E is a link for connecting the lever C to the steelyard, and F and G are the knife-edge pivots which bear against the ends of the link, so that it may work without friction.

L is a link which engages with the free end of the steelyard and affords a passage for the lifting-rope M.

K is a rod, rope, or chain secured to the bottom of said link and having the toothed rack P secured to its lower end.

O is a spring secured to the bottom of the toothed rack.

T is a shaft journaled in the crane-frame and having the quadrant-arm U secured upon it. A cord, chain, or other flexible connection U' is secured to the bottom of the circular arc of the quadrant-arm and has its other end secured to spring O.

S is a dial secured to the crane-frame and provided with the pointer R, having the toothed pinion R' secured on its spindle and engaging with the toothed rack. Rollers s are arranged behind the rack for keeping it in gear with the pinion.

V is a hand-lever secured to shaft T. When the weighing apparatus is required to be used, the hand-lever V is depressed and slipped under the pin v, projecting from the crane-frame. This pulls upon rod K and raises the end of lever C clear of the stop-plate Z. The load is raised by the crane either before or after the weighing apparatus has been brought into action by the hand-lever, and the weight of the load is indicated by the pointer on the dial.

It is obvious that a pivoted steelyard with a sliding weight, such as ordinarily used on weighing-machines, or any other form of weighing mechanism, might be substituted for the spring-balance and dial above described.

What I claim is—

1. The combination, with a crane provided with lifting mechanism and a head-sheave for the lifting-rope to pass over, of a pivoted lever supporting said sheave with its free end projecting beyond it and normally resting against a stop-plate on the crane-frame, weighing mechanism operatively connected to said lever, and a hand-lever operatively connected to said weighing mechanism for bringing it into action and simultaneously raising the end of said lever from the stop-plate, thereby permitting the weight of the load on the lifting-rope to be indicated by the weighing mechanism, substantially as and for the purpose set forth.

2. The combination, with a crane provided with lifting mechanism, of a lever pivoted at the head of the crane and normally resting against a stop-plate, a head-sheave journaled in said lever, a steelyard pivoted above said sheave, a link connecting one end of said steelyard with the free end of said lever, weight-registering mechanism, such as a spring-balance, operatively connected to the other end of the steelyard, and a hand-lever adapted to raise the end of the lever supporting the head-sheave, thereby permitting the weight on the lifting-rope to be indicated, substantially as and for the purpose set forth.

In testimony whereof I affix my signature in presence of two witnesses.

JAMES GASKELL.

Witnesses:
    JESSE NORRIS,
    J. HUGHES.